(12) United States Patent
Paolini, Jr. et al.

(10) Patent No.: US 9,529,240 B2
(45) Date of Patent: Dec. 27, 2016

(54) CONTROLLED POLYMERIC MATERIAL CONDUCTIVITY FOR USE IN A TWO-PHASE ELECTRODE LAYER

(71) Applicant: E INK CORPORATION, Billerica, MA (US)

(72) Inventors: Richard J. Paolini, Jr., Framingham, MA (US); Stephen J. Telfer, Arlington, MA (US)

(73) Assignee: E INK CORPORATION, Billerica, MA (US)

( * ) Notice: Subject to any disclaimer, the term of this patent is extended or adjusted under 35 U.S.C. 154(b) by 54 days.

(21) Appl. No.: 14/599,169

(22) Filed: Jan. 16, 2015

(65) Prior Publication Data

US 2015/0205178 A1 Jul. 23, 2015

Related U.S. Application Data

(60) Provisional application No. 61/928,651, filed on Jan. 17, 2014.

(51) Int. Cl.
| | |
|---|---|
| *G02B 26/00* | (2006.01) |
| *G09G 3/34* | (2006.01) |
| *G02F 1/155* | (2006.01) |
| *G02B 26/02* | (2006.01) |
| *G02F 1/167* | (2006.01) |

(Continued)

(52) U.S. Cl.
CPC ............ *G02F 1/155* (2013.01); *G02B 26/026* (2013.01); *G02F 1/167* (2013.01); *G09G 3/34* (2013.01); *G02F 1/1508* (2013.01); *G02F 2001/1676* (2013.01); *G02F 2001/1678* (2013.01); *G02F 2202/36* (2013.01); *G09G 3/344* (2013.01); *G09G 3/38* (2013.01)

(58) Field of Classification Search
CPC ............ G02F 1/01; G02F 1/008; G02F 1/155; G02F 1/1508; G02F 1/167; G02F 1/172; G02F 2001/1676; G02F 2001/1678; G02F 2202/36; G02B 26/00; G02B 26/026; G09G 3/34; G09G 3/344; G09G 3/38
USPC ....... 359/237, 238, 245, 253, 265, 270, 273, 359/279, 296; 345/105, 107
See application file for complete search history.

(56) References Cited

U.S. PATENT DOCUMENTS

| | | |
|---|---|---|
| 5,760,761 A | 6/1998 | Sheridon |
| 5,808,783 A | 9/1998 | Crowley |

(Continued)

OTHER PUBLICATIONS

Hayes, R.A., et al., "Video-Speed Electronic Paper Based on Electrowetting", Nature, vol. 425, Sep. 25, pp. 383-385 (2003) Sep. 25, 2003.

(Continued)

*Primary Examiner* — Loha Ben
(74) *Attorney, Agent, or Firm* — Brian D. Bean (57) ABSTRACT

An electro-optic display containing a two-phase, light-transmissive electrically-conductive layer comprising a first phase made of a highly electronically-conductive matrix and a second phase made of a polymeric material composition having a controlled volume resistivity. The matrix of the first phase may be formed from carbon nanotubes, silver nanowires, a metal coated open foam structure, or a printed mesh of wires. The polymeric material composition of the second phase may be a conductive polymer, or a polymer and an additive such as a salt, a polyelectrolyte, a polymer electrolyte, or a solid electrolyte, or combinations thereof.

16 Claims, 1 Drawing Sheet

(51) Int. Cl.
G02F 1/15 (2006.01)
G09G 3/38 (2006.01)

(56) References Cited

U.S. PATENT DOCUMENTS

| | | | |
|---|---|---|---|
| 5,835,577 A | 11/1998 | Disanto | |
| 5,930,026 A | 7/1999 | Jacobson | |
| 5,961,804 A | 10/1999 | Jacobson | |
| 6,017,584 A | 1/2000 | Albert | |
| 6,054,071 A | 4/2000 | Mikkelsen, Jr. | |
| 6,055,091 A | 4/2000 | Sheridon | |
| 6,067,185 A | 5/2000 | Albert | |
| 6,097,531 A | 8/2000 | Sheridon | |
| 6,118,426 A | 9/2000 | Albert | |
| 6,120,588 A | 9/2000 | Jacobson | |
| 6,120,839 A | 9/2000 | Comiskey | |
| 6,124,851 A | 9/2000 | Jacobson | |
| 6,128,124 A | 10/2000 | Silverman | |
| 6,130,773 A | 10/2000 | Jacobson | |
| 6,130,774 A | 10/2000 | Albert | |
| 6,137,467 A | 10/2000 | Sheridon | |
| 6,147,791 A | 11/2000 | Sheridon | |
| 6,172,798 B1 | 1/2001 | Albert | |
| 6,177,921 B1 | 1/2001 | Comiskey | |
| 6,232,950 B1 | 5/2001 | Albert | |
| 6,241,921 B1 | 6/2001 | Jacobson | |
| 6,249,271 B1 | 6/2001 | Albert | |
| 6,252,564 B1 | 6/2001 | Albert | |
| 6,262,706 B1 | 7/2001 | Albert | |
| 6,262,833 B1 | 7/2001 | Loxley | |
| 6,300,932 B1 | 10/2001 | Albert | |
| 6,301,038 B1 | 10/2001 | Fitzmaurice | |
| 6,312,304 B1 | 11/2001 | Duthaler | |
| 6,312,971 B1 | 11/2001 | Amundson | |
| 6,323,989 B1 | 11/2001 | Jacobson | |
| 6,327,072 B1 | 12/2001 | Comiskey | |
| 6,376,828 B1 | 4/2002 | Comiskey | |
| 6,377,387 B1 | 4/2002 | Duthaler | |
| 6,392,785 B1 | 5/2002 | Albert | |
| 6,392,786 B1 | 5/2002 | Albert | |
| 6,413,790 B1 | 7/2002 | Duthaler | |
| 6,422,687 B1 | 7/2002 | Jacobson | |
| 6,445,374 B2 | 9/2002 | Albert | |
| 6,445,489 B1 | 9/2002 | Jacobson | |
| 6,459,418 B1 | 10/2002 | Comiskey | |
| 6,473,072 B1 | 10/2002 | Comiskey | |
| 6,480,182 B2 | 11/2002 | Turner | |
| 6,498,114 B1 | 12/2002 | Amundson | |
| 6,504,524 B1 | 1/2003 | Gates | |
| 6,506,438 B2 | 1/2003 | Duthaler | |
| 6,512,354 B2 | 1/2003 | Jacobson | |
| 6,515,649 B1 | 2/2003 | Albert | |
| 6,518,949 B2 | 2/2003 | Drzaic | |
| 6,521,489 B2 | 2/2003 | Duthaler et al. | |
| 6,531,997 B1 | 3/2003 | Gates | |
| 6,535,197 B1 | 3/2003 | Comiskey | |
| 6,538,801 B2 | 3/2003 | Jacobson | |
| 6,545,291 B1 | 4/2003 | Amundson | |
| 6,580,545 B2 | 6/2003 | Morrison | |
| 6,639,578 B1 | 10/2003 | Comiskey | |
| 6,652,075 B2 | 11/2003 | Jacobson | |
| 6,657,772 B2 * | 12/2003 | Loxley | G02F 1/167 345/85 |
| 6,664,944 B1 | 12/2003 | Albert | |
| 6,672,921 B1 | 1/2004 | Liang | |
| 6,680,725 B1 | 1/2004 | Jacobson | |
| 6,683,333 B2 | 1/2004 | Kazlas | |
| 6,693,620 B1 | 2/2004 | Herb | |
| 6,704,133 B2 | 3/2004 | Gates | |
| 6,710,540 B1 | 3/2004 | Albert | |
| 6,721,083 B2 | 4/2004 | Jacobson | |
| 6,724,519 B1 | 4/2004 | Comiskey | |
| 6,727,881 B1 | 4/2004 | Albert | |
| 6,738,050 B2 | 5/2004 | Comiskey | |
| 6,750,473 B2 | 6/2004 | Amundson | |
| 6,753,999 B2 | 6/2004 | Zehner | |
| 6,781,745 B2 | 8/2004 | Chung | |
| 6,788,449 B2 | 9/2004 | Liang | |
| 6,816,147 B2 | 11/2004 | Albert | |
| 6,819,471 B2 | 11/2004 | Amundson | |
| 6,822,782 B2 | 11/2004 | Honeyman | |
| 6,825,068 B2 | 11/2004 | Denis | |
| 6,825,829 B1 | 11/2004 | Albert | |
| 6,825,970 B2 | 11/2004 | Goenaga | |
| 6,831,769 B2 * | 12/2004 | Holman | G02F 1/133305 156/250 |
| 6,839,158 B2 | 1/2005 | Albert | |
| 6,842,167 B2 | 1/2005 | Albert | |
| 6,842,279 B2 | 1/2005 | Amundson | |
| 6,842,657 B1 | 1/2005 | Drzaic | |
| 6,864,875 B2 | 3/2005 | Drzaic | |
| 6,865,010 B2 | 3/2005 | Duthaler et al. | |
| 6,866,760 B2 | 3/2005 | Paolini, Jr. et al. | |
| 6,870,657 B1 | 3/2005 | Fitzmaurice | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson | |
| 7,002,728 B2 | 2/2006 | Pullen et al. | |
| 7,012,600 B2 | 3/2006 | Zehner | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates | |
| 7,038,655 B2 | 5/2006 | Herb | |
| 7,061,663 B2 | 6/2006 | Cao et al. | |
| 7,071,913 B2 | 7/2006 | Albert et al. | |
| 7,075,502 B1 | 7/2006 | Drzaic | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 * | 2/2007 | Doshi | C09J 175/04 345/107 |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 * | 6/2007 | LeCain | G02F 1/167 359/296 |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner | |
| 7,312,916 B2 | 12/2007 | Pullen | |

(56) References Cited

U.S. PATENT DOCUMENTS

| | | |
|---|---|---|
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler et al. |
| 7,375,875 B2 | 5/2008 | Whitesides |
| 7,382,363 B2 | 6/2008 | Albert et al. |
| 7,388,572 B2 * | 6/2008 | Duthaler .............. G02B 26/026 345/107 |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. |
| 7,513,813 B2 | 4/2009 | Paolini, Jr. et al. |
| 7,528,822 B2 | 5/2009 | Amundson |
| 7,532,388 B2 | 5/2009 | Whitesides et al. |
| 7,535,624 B2 * | 5/2009 | Amundson .............. C08K 3/22 345/107 |
| 7,545,358 B2 | 6/2009 | Gates et al. |
| 7,551,346 B2 | 6/2009 | Fazel |
| 7,554,712 B2 | 6/2009 | Patry et al. |
| 7,561,324 B2 | 7/2009 | Duthaler et al. |
| 7,583,427 B2 | 9/2009 | Danner |
| 7,602,374 B2 | 10/2009 | Zehner et al. |
| 7,605,799 B2 | 10/2009 | Amundson et al. |
| 7,612,760 B2 | 11/2009 | Kawai |
| 7,636,191 B2 | 12/2009 | Duthaler |
| 7,649,666 B2 | 1/2010 | Isobe et al. |
| 7,649,674 B2 | 1/2010 | Danner et al. |
| 7,667,684 B2 | 2/2010 | Jacobson et al. |
| 7,672,040 B2 | 3/2010 | Sohn |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson |
| 7,733,335 B2 | 6/2010 | Zehner et al. |
| 7,733,554 B2 | 6/2010 | Danner et al. |
| 7,787,169 B2 | 8/2010 | Abramson et al. |
| 7,791,782 B2 | 9/2010 | Paolini, Jr. |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 7,848,007 B2 | 12/2010 | Paolini, Jr. |
| 7,859,637 B2 | 12/2010 | Amundson et al. |
| 7,893,435 B2 | 2/2011 | Kazlas et al. |
| 7,903,319 B2 | 3/2011 | Honeyman |
| 7,910,175 B2 | 3/2011 | Webber |
| 7,952,557 B2 | 5/2011 | Amundson et al. |
| 7,952,790 B2 | 5/2011 | Honeyman |
| 7,999,787 B2 | 8/2011 | Amundson |
| 8,009,348 B2 | 8/2011 | Zehner |
| 8,018,640 B2 | 9/2011 | Whitesides |
| 8,034,209 B2 | 10/2011 | Danner |
| 8,064,962 B2 | 11/2011 | Wilcox et al. |
| 8,068,272 B2 | 11/2011 | LeCain et al. |
| 8,077,381 B2 | 12/2011 | LeCain et al. |
| 8,115,729 B2 | 2/2012 | Danner |
| 8,125,501 B2 | 2/2012 | Amundson |
| 8,129,655 B2 | 3/2012 | Jacobson et al. |
| 8,139,050 B2 | 3/2012 | Jacobson et al. |
| 8,174,490 B2 | 5/2012 | Whitesides |
| 8,177,942 B2 | 5/2012 | Paolini, Jr. |
| 8,319,759 B2 | 11/2012 | Jacobson |
| 8,390,301 B2 | 3/2013 | Danner |
| 8,446,664 B2 | 5/2013 | Chen |
| 8,466,852 B2 | 6/2013 | Drzaic |
| 8,482,835 B2 | 7/2013 | LeCain |
| 8,558,783 B2 | 10/2013 | Wilcox |
| 8,610,988 B2 | 12/2013 | Zehner et al. |
| 8,717,347 B2 | 5/2014 | Zheng |
| 8,786,929 B2 | 7/2014 | LeCain |
| 8,830,553 B2 | 9/2014 | Patry |
| 8,928,562 B2 | 1/2015 | Gates et al. |
| 9,005,494 B2 | 4/2015 | Valianatos |
| 9,075,280 B2 | 7/2015 | Whitesides |
| 2002/0060321 A1 | 5/2002 | Kazlas |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2005/0012980 A1 | 1/2005 | Wilcox et al. |
| 2005/0018273 A1 | 1/2005 | Honeyman et al. |
| 2005/0069683 A1 | 3/2005 | Aylward et al. |
| 2005/0122306 A1 | 6/2005 | Wilcox et al. |
| 2005/0122563 A1 | 6/2005 | Honeyman et al. |
| 2005/0124751 A1 | 6/2005 | Klingenberg et al. |
| 2005/0156340 A1 | 7/2005 | Valianatos et al. |
| 2005/0253777 A1 | 11/2005 | Zehner et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0285385 A1 | 12/2007 | Albert |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0130092 A1 | 6/2008 | Whitesides |
| 2009/0122389 A1 | 5/2009 | Whitesides |
| 2011/0157683 A1 | 6/2011 | Lipovetskaya |
| 2011/0164301 A1 | 7/2011 | Paolini, Jr. |
| 2011/0286081 A1 | 11/2011 | Jacobson |
| 2015/0205178 A1 | 7/2015 | Paolini, Jr. |

OTHER PUBLICATIONS

Kitamura, T., et al., "Electrical toner movement for electronic paper-like display", Asia Display/IDW '01, p. 1517, Paper HCS1-1 (2001) Dec. 31, 2001.

Yamaguchi, Y., et al., "Toner display using insulative particles charged triboelectrically", Asia Display/IDW '01, p. 1729, Paper AMD4-4 (2001) Dec. 31, 2001.

International Search Report and Written Opinion for PCT/US2015/011808 Apr. 24, 2015.

* cited by examiner

CONTROLLED POLYMERIC MATERIAL CONDUCTIVITY FOR USE IN A TWO-PHASE ELECTRODE LAYER

REFERENCE TO RELATED APPLICATIONS

This application is related to:
(a) U.S. Pat. No. 7,012,735, filed Mar. 26, 2004;
(b) U.S. Pat. No. 7,349,148, filed Dec. 20, 2006, which is a divisional of U.S. Pat. No. 7,173,752, field Nov. 5, 2004;
(c) U.S. Pat. No. 8,446,664, filed Apr. 4, 2011; and
(b) copending U.S. application Ser. No. 12/264,696, filed Nov. 4, 2008 (Publication No. 2009/0122389 A1).

The entire contents of these patents and copending applications, and of all other U.S. patents and published and copending applications mentioned below, are herein incorporated by reference.

BACKGROUND OF INVENTION

This invention relates to electro-optic displays and, more specifically, to electro-optic assemblies containing a two-phase, light-transmissive electrically-conductive layer comprising a first phase made of a highly electronically-conductive matrix and a second phase made of a polymeric material composition having a controlled volume resistivity. In another aspect, this invention provides for a two-phase electrode layer wherein the polymeric material composition of the second phase is made from a conductive polymer. In another aspect, this invention provides for a two-phase electrode layer wherein the polymeric material composition of the second phase is made from a polymer and an additive. The polymeric material compositions disclosed herein may be useful for applications other than electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:
  (a) Electrophoretic particles, fluids and fluid additives; see for example U.S. Pat. Nos. 7,002,728 and 7,679,814;
  (b) Capsules, binders and encapsulation processes; see for example U.S. Pat. Nos. 5,930,026; 6,067,185; 6,130,774; 6,172,798; 6,249,271; 6,327,072; 6,392,785;

6,392,786; 6,459,418; 6,839,158; 6,866,760; 6,922,276; 6,958,848; 6,987,603; 7,061,663; 7,071,913; 7,079,305; 7,109,968; 7,110,164; 7,202,991; 7,242,513; 7,304,634; 7,339,715; 7,391,555; 7,411,719; 7,477,444; 7,561,324; 7,848,007; 7,910,175; 7,952,790; 8,035,886; and 8,129,655; and U.S. Patent Applications Publication Nos. 2005/0156340; 2007/0091417; 2008/0130092; 2009/0122389; 2010/0044894; 2011/0286080; and 2011/0286081;

(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; and 8,177,942; and U.S. Patent Applications Publication Nos. 2008/0309350; 2009/0034057; 2009/0109519; 2009/0168067; 2011/0032595; 2011/0032396; 2011/0075248; 2011/0164301; and 2012/0176664;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. No. 7,075,502; and U.S. Patent Applications Publication No. 2007/0109219;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,693,620; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,220; 6,958,848; 6,967,640; 6,980,196; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,290; 7,236,292; 7,242,513; 7,247,379; 7,256,766; 7,259,744; 7,280,094; 7,304,634; 7,304,787; 7,312,784; 7,312,794; 7,312,916; 7,327,511; 7,339,715; 7,349,148; 7,352,353; 7,365,394; and 7,365,733; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0257635; 2004/0263947; 2005/0000813; 2005/0007336; 2005/0012980; 2005/0018273; 2005/0024353; 2005/0062714; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; 2007/0286975; 2007/0286975; 2008/0013155; 2008/0013156; 2008/0023332; 2008/0024429; 2008/0024482; 2008/0030832; 2008/0043318; 2008/0048969; 2008/0048970; 2008/0054879; 2008/0057252; and 2008/0074730; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated and microcell electrophoretic displays.

U.S. Pat. No. 6,982,178, filed May 22, 2003, describes a "front plane laminate" ("FPL") for use in an electro-optic display which comprises, in order, a light-transmissive electrically-conductive layer or electrode layer; a layer of a solid electro-optic medium in electrical contact with the electrically-conductive layer; an adhesive layer; and a release sheet.

Most electro-optic displays require a light-transmissive electrically-conductive layer to act as one electrode of the display and through which an observer can view changes in the optical state of the electro-optic medium. In some cases, for example variable transmission windows, both electrodes must be light-transmissive. Traditionally, the light-transmissive electrically-conductive layer is formed from indium tin oxide (ITO) on some type of mechanical support, such as a polymeric film or a glass plate. More recently, films made with thin metal mesh materials, such as carbon nanotubes and silver wire, are replacing ITO films as the light-transmissive electrically-conductive layer. Such films comprise regions of high conductivity surrounded by regions of significantly less conductivity, which may accumulate electrical charges and disrupt the performance of the electro-optical display. Accordingly, there is a need for a metal mesh-based electrode layer which does not suffer from these disadvantages.

SUMMARY OF INVENTION

This invention provides an electro-optic display comprising a two-phase electrode layer wherein a first phase is made of a highly electronically-conductive matrix and a second phase is made of a polymeric material composition having a controlled volume resistivity. In one form of the present invention, the polymeric material of the second phase may be intrinsically conductive or may be a polymer mixed with an additive, such that the polymeric material has a resistivity of not more than $1\times10^{12}$ Ohm-cm. The polymer may be selected from, for example, polyurethane, vinyl acetate, vinyl acetate ethylene, epoxy, or polyacrylic, or combinations thereof.

In another form, the present invention provides a two-phase electrode layer wherein the second phase is an ionic conductive polymer in which one ion can migrate through the polymeric material while the other cannot, for example, an ionic salt of a polymeric carboxylate.

In another form of the present invention, the polymeric material of the second phase may contain one or more conducting polymers selected from PEDOT-PSS, polyacetylene, polyphenylene sulfide, polyphenylene vinylene and combinations thereof.

In another form of the present invention, the additive in the second phase may be selected from, for example, a salt, a polyelectrolyte, a polymer electrolyte, a solid electrolyte, or combinations thereof.

In one form, the additive in the polymeric material is a salt; for example, an inorganic salt, an organic salt, or combinations thereof. In one particular embodiment, the salt comprises potassium acetate. In an alternative form, the salt may comprise a quaternary ammonium salt, for example a tetraalkylammonium salt, such as tetrabutylammonium chloride or hexafluorophosphate. In another form, the additive may be a salt having anions containing at least three fluorine atoms; for example, the additive may have a hexafluorophosphate anion such as 1-butyl-3-methylimidazolium hexafluorophosphate.

In another form of the present invention, the additive in the second phase is a polyelectrolyte and may comprise a salt of a polyacid such as, but not limited to, an alkali metal salt of polyacrylic acid.

In another form of the present invention, the additive in the polymeric material of the second phase may be selected from a non-reactive solvent, a conductive organic compound, and combinations thereof.

In another form of the present invention, the additive in the second phase may be a low number average molecular weight polymer containing hydroxyl, such as poly(ethylene glycol) (PEG) where the protons, rather than the electrons, move.

The polymeric material containing the additive may be provided with regions of differing colors and serve as a color filter. Alternatively, the polymeric material may comprise an optical biasing element.

In one aspect, there is provided an electro-optic assembly comprising first and second substrates, and an adhesive layer and a layer of electro-optic material disposed between the first and second substrates. In the electro-optic assembly, at least one of the first and second substrates may comprise a two-phase electrode layer wherein the first phase is a highly conductive matrix and the second phase is a polymeric material having controlled resistivity, the second substrate may comprise a release sheet, and the electro-optic medium may be a solid electro-optic medium; thus, the entire electro-optic assembly will have the form of a front plane laminate as described in the aforementioned U.S. Pat. No. 6,982,178.

In another aspect of the present invention, there is provided an electro-optic assembly comprising first and second substrates, an adhesive layer and a layer of electro-optic material disposed between the first and second substrates, and a two-phase electrode layer wherein the first phase is a highly conductive matrix and the second phase is a polymeric material having controlled resistivity.

DETAILED DESCRIPTION

Figure 1:
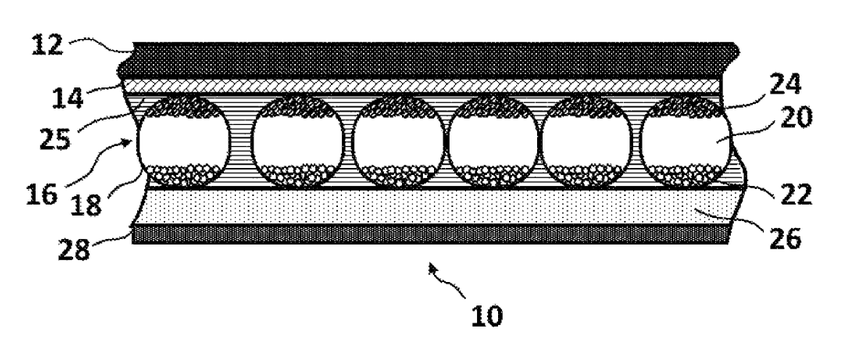
FIGURE is a schematic cross-section through a basic front plane laminate (10) of an electro-optic display having a conductive layer of the present invention.

Accordingly, this invention provides an electro-optic display comprising a two-phase, light-transmissive electrically-conductive layer containing a first phase made from a highly conductive matrix and a second phase made from a polymeric material composition having a controlled volume resistivity. An electro-optic display normally comprises a layer of electro-optic material and at least two other layers disposed on opposite sides of the electro-optic material, at least one of these being a light-transmissive electrically-conductive layer. The term "light-transmissive" is used herein to mean that the layer thus designated transmits sufficient light to enable an observer, looking through that layer, to observe the change in display states of the electro-optic medium, which will be normally be viewed through the electrically-conductive layer and adjacent substrate (if present).

The first phase may be a conductive matrix. The term "conductive matrix" is used herein to describe the first phase array of highly conductive regions of the electrode layer. The matrix may be constructed from carbon nanotubes, silver nanowires, a metal coated open foam structure, a printed mesh of wires, or any such material that does not fully cover the viewing surface. The first phase may be light-transmissive or light-absorbing with a diameter size ranging from nanometers to millimeters. The matrix may be arranged regularly (i.e., grid-like, hexagonally, webbed, etc.) or irregularly (i.e., randomly). The matrix may be arranged to be very thin or sparsely populated such that the electrode layer is light-transmissive.

The second phase may be made from an intrinsically conductive polymer or a polymer mixed with a conductive additive. The second phase, while significantly less conductive compared to the first phase, has conductive properties (i.e., a resistivity of not more than $1\times10^{12}$ Ohm-cm). Preferably, the second phase has a resistivity of approximately $1\times10^7$ to $1\times10^{12}$ Ohm-cm. The second phase may be ionically or electronically conductive. Typically, the second phase surrounds or coats the first phase to create less conductive regions around the conductive matrix. This provides mechanical integrity and protection to the first phase, which may be fragile due to its structure. If the first phase is light-absorbing and the second phase is light-transmissive, a high ratio of less conductive areas to highly conductive areas is desirable. More preferably, the first phase makes up less than 10% of the viewing area while the second phase makes up the remaining viewing area.

The polymeric material may be any polymeric material that fulfills the particular needs of the end-use application. Examples of suitable polymeric materials include polyurethane, vinyl acetate, vinyl acetate ethylene, epoxy, a polyacrylic-based adhesive, or combinations thereof. These adhesive materials may be solvent based or aqueous based. An example of a particular polyurethane that may be used is described in U.S. Pat. No. 7,342,068, issued Mar. 11, 2008, which is incorporated herein by reference in its entirety and assigned to Air Products and Chemicals, Inc.

FIGURE is a schematic cross-section through a basic front plane laminate (10) of an electro-optic display having a conductive layer of the present invention. Typically, the light-transmissive electrically-conductive layer (14) will be carried on a light-transmissive substrate (12), which is preferably flexible, in the sense that the substrate can be manually wrapped around a drum (say) 10 inches (254 mm) in diameter without permanent deformation. The substrate will be typically be a polymeric film, and will normally have a thickness in the range of about 1 to about 25 mil (25 to 634 μm), preferably about 2 to about 10 mil (51 to 254 μm). The substrate (12) forms the viewing surface of the final display and may have one or more additional layers, for example, a protective layer to absorb ultra-violet radiation, barrier layers to prevent ingress of moisture, or anti-reflection coatings.

The conductive layer (14) comprises the two-phase electrode layer. A layer of electro-optic medium (16) is in electrical contact with the conductive layer (14). The electro-optic medium shown in FIGURE is an opposite charge dual particle encapsulated electrophoretic medium having a plurality of microcapsules, each of which comprises a capsule wall (18) containing a hydrocarbon-based liquid (20) in which are suspended negatively charged white particles (22) and positively charged black particles (24). The microcapsules are retained within a binder (25). Upon application of an electrical filed across the electro-optic layer (16), the white particles (22) move to the positive electrode and the black particles (24) move to the negative electrode, so that the layer (16) appears, to an observer viewing the display through the substrate (12), white or black depending upon whether the layer (14) is positive or negative relative to the backplane at any point within the final display.

The front plane laminate (10) as shown in FIGURE further comprises a layer of lamination adhesive (26) adjacent the electro-optic medium layer (16) and a release sheet (28) covering the adhesive layer (26). The release layer (28) is peeled from the adhesive layer (26) and the adhesive layer is laminated to a backplane to form the final electro-optic display.

The two-phase conductive layer of the present invention may be the front electrode of an electro-optic display, which is the electrode located on the side closest to the viewing surface. In an electro-optic display that is fully light-transmissive or has two viewing surfaces, the two-phase conductive layer of the present invention may be both the front and back electrodes.

For an electro-optic display, it is critical to control the electrical properties of the polymeric material; otherwise, the display may experience diminished optical performance. Optical performance may be enhanced when the bulk resistance of the polymeric material is not more than $1\times10^{12}$ Ohm-cm.

Conductive Polymers

In another form, the present invention provides a two-phase electrode layer wherein the second phase is an ionic conductive polymer in which one ion can migrate through the polymeric material while the other cannot. This type of ionic material prevents ions diffusing out of the polymeric material and potentially damaging other layers (for example, organic semiconductor layers) into which the ions diffuse.

Ionic conduction has been shown to occur by a "hopping" mechanism, in which dissociated free ions translate among ionic aggregates (ion pairs and higher aggregates), most of these aggregates being essentially neutral. In accordance with the present invention, only one of the anion and cation of the ionic material is capable of motion. The fixed ion is constrained to a single location, while the mobile ion is still free to migrate. An example of an appropriate ionic material is a polymeric salt, for example, an ionic salt of a polymeric carboxylate. In this case, the carboxylate ion is effectively immobile because it is attached to the polymer chain, and can only move with the polymer as a whole. The cationic counterion, on the other hand, can freely participate in hopping motions, and the rate at which it can move depends on the strength of the electrostatic interaction with the anionic carboxylate, the concentration of carboxylate-counterion aggregates in the adhesive medium, the viscosity of the medium, and the free energy of solvation of the counterion by the medium.

As described in U.S. Patent Publication No. 2009/0122389, filed Nov. 4, 2008, assigned to E Ink Corporation, large cations are advantageous, in that they have relatively low electrostatic energies of attraction to the ionic aggregate states, and therefore dissociate readily from them. As an example, a quaternary ammonium hydroxide could be used to neutralize the carboxylic functions on the polyurethane, leading to a quaternary ammonium carboxylate polymer capable of supporting ionic conduction as described above.

It is desirable that the ionic material be chosen such that the conductivity of the final polymeric material after drying can be modified and adjusted by varying the carboxylic acid content of the polyurethane, and also by the cation used. For example, in the aforementioned system where a carboxylic group on the polyurethane is neutralized with a quaternary ammonium hydroxide, at a given carboxylic acid content, the conductivity would be expected to increase in the order:

tetramethylammonium<tetraethylammonium<tetrabutyl ammonium, etc.

Phosphonium salts could also be used, and should be somewhat more conductive than the nitrogen containing analogs because of the larger size of the central atom. Other cationic species (e.g., complex ions of metals) may also be useful for this purpose. Solubility of the ionic material in the polymer material is not an issue in this approach, since the ions are an intrinsic part of the medium and cannot therefore phase separate as a separate crystalline phase.

The acidic component of the polymeric material may also be made more acidic by replacing a carboxylic acid component by a group with a higher dissociation constant, for example, a sulfate monoester, sulfonic acid, sulfinic acid, a phosphonic acid, phosphinic acid group or phosphate ester, as long as there is at least one dissociable proton present. Quaternary salts and other large cations would still be expected to be most useful as counter ions because of their large size, and relatively high degree of ionic dissociation in dried adhesive media of low polarity. Nitrogen-based acids could also be used if attached to sufficiently electron-withdrawing functions (e.g., $RSO_2$—NH—$SO_2R$)). In this case almost any mobile ion could be used, including tertiary ammonium, because the mobile ion will exist in the protonated form even in the dried adhesive. However, mobile ions based on larger amines (i.e., ones with longer alkyl tails) might still be preferable, because they are effectively larger in size and therefore the ion pairs comprising them would be more dissociable. Alternatively, a carboxylate group on the polymer could be used with a mobile ion that is not a strong Bronsted acid, i.e., which does not have an acidic proton, such as the quaternary cations discussed above.

Polymeric materials in which a cation is the fixed ion can be constructed by using quaternary ammonium groups in the polymer backbone or as side chains, and preferably using large anions (e.g., hexafluorophosphate, tetrabutylborate, tetraphenylborate, etc.) as the mobile ions. The quaternary ammonium groups could be replaced by phosphonium, sulfonium or other cationic groups without dissociable hydrogen, including those formed by complexation with metallic cations. Examples of the latter include polyether/lithium ion inclusion complexes, especially cyclic polyethers (e.g. 18-crown-6) or polyamine complexes with transition metal ions. In this case the anionic mobile ion could include those types of ions listed above, plus more strongly basic materials such as carboxylates or even phenolates.

Alternative fixed cation polymeric materials include polymers containing repeating units derived from basic monomers, for example poly(vinylpyridine), poly(β-dimethylaminoethyl acrylate), etc. and copolymers containing such groups, in conjunction with mobile anions that are not good Bronsted acceptors (e.g., sulfonates, sulfates, hexafluorophosphate, tetrafluoroborate, bis(methanesulfonyl)imidate, phosphates, phosphonates, etc.). Quaternary salts derived from such amino monomers may also be used, for example, poly(N-methyl or benzyl(vinylpyridinium)), poly(N-alkyl (or alkaryl)-N'-vinyl-imidazolium), and poly(β-trimethylammonioethyl)acrylate or methacrylate) salts, as well as vinyl copolymers comprising these ionic groups. As before, larger mobile ions are preferred.

These chemical modification techniques are not restricted to polyurethanes but can be applied to any polymer of suitable structure. For example, vinyl-based polymers can contain either anions or cation fixed ions.

In another form of the present invention, the polymeric material may contain one or more conducting polymers selected from PEDOT-PSS, polyacetylene, polyphenylene sulfide, polyphenylene vinylene and combinations thereof. The thickness of the polymeric material may range from approximately 0.1 μm to 20 μm. The polymeric material may be (a) water-soluble or water dispersible and coated from water, (b) soluble or dispersible in organic solvent and coated from organic solvent, or (c) coated in monomeric form or oligomeric form and then polymerized by UV irradiation, heating, or other methods known in the art. The additive incorporated into a polymeric material may be formed in situ; in other words, one or more precursor materials may be incorporated into the polymeric material where the precursor material(s) can react with one another, or with the polymeric material, or be changed by exposure of the polymeric material to conditions (for example, exposure to heat, light, or magnetic or electric fields) which cause a change in the precursor materials to form the final additive.

Diffusible Ionic Additives

The second phase may contain one or more ionic additives, for example, (a) a salt, a polyelectrolyte, a polymer electrolyte, a solid electrolyte, and combinations thereof; or (b) a non-reactive solvent, a conductive organic compound, and combinations thereof.

In one form, the additive may be a salt such as an inorganic salt, organic salt, or combination thereof, as described in U.S. Pat. No. 7,012,735, filed Mar. 26, 2004, assigned to E Ink Corporation. Exemplary salts include potassium acetate, and tetraalkylammonium salts, especially tetrabutylammonium salts such as the chloride. Further examples of salts include salts such as $RCF_3SOF_3$, $RClO_4$, $LiPF_6$, $RBF_4$, $RAsF_6$, $RB(Ar)_4$ and $RN(CF_3SO_2)_3$ where R may be any cation, such as $Li^+$, $Na^+$, $H^+$, or $K^+$. Alternatively, R may include ammonium groups of the form $N^+R1R2R3R4$. A preferred salt is tetrabutylammonium hexafluorophosphate.

In another form, the additive may be a salt having anions containing at least three fluorine atoms as described in U.S. Pat. No. 8,446,664, filed Apr. 4, 2011, assigned to E Ink Corporation. The salt may, for example, have a hexafluorophosphate anion. The salt may also have an imidazolium cation. Exemplary salts include 1-butyl-3-methylimidazolium hexafluorophosphate (hereinafter "BMIHFP"), 1-butyl-3-methylpiperidinium hexafluorophosphate, 1-butyl-3-methylpyridinium hexafluorophosphate, 1-ethyl-3-methylimidazolium hexafluorophosphate, sodium hexafluorophosphate, 1-butyl-3-methylimidazolium trifluoromethanesulfonate and 1-butyl-3-methylimidazolium boron tetrafluoride. A preferred salt is BMIHFP. This preferred salt is liquid at 25° C. and can be dispersed directly in an aqueous polymer dispersion or latex without the use of any solvent. Alternatively, since the preferred salt is soluble in water in an amount of about 1 percent at 25° C., this salt can be added in the form of a dilute aqueous solution. Addition of the salt as an aqueous solution avoids the introduction of any undesirable organic solvent into the binder.

Alternatively, the fluorine-containing salt may have a tetrafluoroborate anion, a tetraphenylborate anion, a bis (trifluoromethane)sulfonamide anion ("triflimide"), a tetra (pentafluorophenyl)borate anion, a tetrakis(3,5-bis(trifluoromethyl)phenyl)borate anion or a trifluoromethanesulfonate anion ("triflate"), for example, 1-butyl-3-methylimidazolium boron tetrafluoride or 1-butyl-3-methylimidazolium trifluoromethanesulfonate. The fluorine-containing salt may be present in an amount of from about 50 to about 10,000 ppm based upon the solids content of the polymeric material, and generally from about 100 to about 1000 ppm.

In other embodiments, the polymer electrolyte is a polyelectrolyte. Polyelectrolytes are typically polymers in which about 10% or more of the molecule is composed of a functional group capable of ionizing to form a charged species. Examples of certain functional groups within a polyelectrolyte include, but are not limited to, carboxylic acids, sulfonic acids, phosphoric acids, and quaternary ammonium compounds. These polymers can be combined with organic or inorganic salts or alternatively used alone.

Examples of polyelectrolytes, include but are not limited to, polyacrylic acid, polystyrene sulfonate, poly(2-vinylpyridine), poly(4-vinylpyridine), poly(dimethylammonium chloride, poly(dimethylaminoethyl methacrylate), poly(diethylaminoethyl methacrylate) and may comprise a salt of a polyacid such as, but not limited to, an alkali metal salt of polyacrylic acid. A preferred polyelectrolyte is the sodium salt of polyacrylic acid.

In a further form of the present invention, the additive is a polymer electrolyte. The term "polymer electrolyte" as used herein describes a polymer that is capable of solubilizing a salt. The solubility of the salt in these polymers can be enhanced by the presence of oxygen and/or nitrogen atoms in the polymer which form ether, carbonyl, carboxylic acids, primary secondary, tertiary, and quaternary amino groups, sulphonic, acids etc. Examples of polymer electrolytes include polyether compounds such as polyethylene oxide, polypropylene oxide, polytetramethyleneoxide, polyamines such as polyethyleinimine, polyvinyl pyrrolidinone, polymers which contain quaternary ammonium groups such as $N^+R1R2R3R4$ wherein R1, R2, R3, and R4 are each independently a H or a straight, branched, or cyclic alkyl group having from 1 to 25 carbon atoms and where the counter ion can be either selected from any organic or inorganic anion.

Still other additives may include a non-reactive solvent that may improve or, alternatively, hinder the mobility of the ions in the solution. Examples of suitable non-reactive solvents include water, diethyl ether, dipropyl ether, diethyleneglycol, glyme, diglyme, N-methylpyrrolidone, etc. In still another embodiment, a conductive organic compound can be used as the additive. Some non-limiting examples of these compounds include polyaniline, polythiophene, polypyrrole, poly-3,4-dioxyethylene thiophene, and derivatives of these materials in their n- or p-doped states.

It is also known, as disclosed in U.S. Pat. No. 7,256,766, filed May 10, 2002, assigned to E Ink Corporation, that an "optical biasing element" may be provided in one of the layers of an encapsulated electrophoretic display to adjust the appearance of the display. Such an optical biasing element may be added to the polymeric material. The electrical properties of the polymeric material containing such an optical biasing element may be optimized by use of the additives described herein.

The optimum amount of additive will of course vary widely with the exact polymeric material and the exact additive used, and the desired volume resistivity of the final mixture. However, by way of general guidance it may be indicated that a concentration of from about $10^{-5}$ to about $10^{-4}$ moles of additive per gram of polymeric material has been found to give useful results. When the additive is a salt, this range is for 1:1 salts such as tetrabutylammonium chloride, tetrabutylammonium hexafluorophosphate and potassium acetate; if 1:2 salts such as sodium carbonate or calcium chloride are used, lower concentrations, of the order of $10^{-6}$ moles of salt per gram of polymeric material may suffice. The volume resistivity of polymeric materials typically varies in a predictable manner with the concentration of the additive, and hence the final choice of how much additive should be added to achieve a desired volume resistivity may readily be determined empirically.

Although small amounts of salts have been added to polymers used as binders and lamination adhesives in prior art electro-optic displays, for example as biocides to protect the polymers from biological degradation during extended storage, such salts are typically used up during storage as they perform their biocidal or similar function. In contrast, the additives used in the present invention are intended to be permanent constituents of the polymeric material since they are intended to effect a permanent adjustment in the conductivity thereof. Also, the optimum amounts of additives used are typically substantially greater than the amounts of salts used as biocides etc.

Hydroxyl Containing Low Molecular Weight Polymer/Glycol Additive

Another form of the present invention relates to an electro-optic display having an electrode layer comprising a first phase made from a conductive matrix and a second phase made from a polymer mixed with an additive wherein the additive is a low number average molecular weight (Mn not greater than about 5000) polymer containing hydroxyl. As described in U.S. Pat. No. 7,349,148, filed Dec. 20, 2006, assigned to E Ink Corporation, a preferred polymer for this purpose is poly(ethylene glycol) (PEG), desirably having Mn not greater than about 2000. In this additive, the protons move rather than the electrons. The optimum concentration of hydroxyl containing polymer additive for any particular system is best determined empirically, but by way of general guidance it may be said that the optimum concentration of typically around $10^{-6}$ to $10^{-5}$ moles per gram of polymeric material.

If, as is typically the case, the electrode layer is formed by coating a film of a solution of the second phase on to a substrate containing the first phase and drying to form the electrode layer, the additive will normally simply be dissolved or dispersed in the solution of the polymeric material before coating. The additive may be added to the solution neat or may be dissolved in an aqueous solution, non-aqueous solution, or combination thereof. It is of course necessary to ensure that the additive is uniformly dispersed throughout the polymeric material in order to prevent variations in conductivity within the final conductive layer, but those skilled in coating technology will be familiar with routine techniques, such as lengthy agitation on a roll mill, for ensuring such uniform dispersion. The two-phase electrode layer may be used with the substrate in place. Alternatively, once set, the second phase may add sufficient structure to the first phase such that the substrate may be removed.

The choice of the specific additive to be used is governed largely by considerations of compatibility with the electrodes and solubility in the polymeric material to which the additive is to be added. If, as is typically the case, the additive is to be added to an aqueous polymeric material, the additive should be chosen to have good water solubility, so that among salts alkali metal and substituted ammonium salts are generally preferred. Care should be taken to ensure that the additive does not cause aggregation of the polymer particles. Also, the additive should desirably not cause major changes in the pH of the polymeric material, and should not chemically react with the electrodes or polymeric material or other parts of the final display with which it eventually comes into contact, for example the backplane.

The addition of one or more additives greatly expands the range of polymeric materials, which can be used in electro-optic displays. In particular, the addition of one or more additives enables the use of polymeric materials which have mechanical properties highly desirable in electro-optic displays but which have volume resistivities in their pure states too high to be useful. Also, since some electro-optic displays, especially encapsulated electrophoretic displays and electrochromic displays, are sensitive to moisture, the addition of the one or more additive may be used to replace water-based polyurethane dispersions hitherto used in such displays with non-hygroscopic and/or hydrophobic polymeric materials.

The polymeric material may contain components other than the additive used to adjust its volume resistivity; for example, the polymeric material may also contain a dye or other colorant.

It will be appreciated that the modified polymeric materials disclosed herein may be useful in applications other than electro-optic displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising a layer of electro-optic material and an electrode layer arranged to apply an electrical field to the layer of electro-optic material, the electrode layer comprising:
 a first phase made of a highly electronically-conductive matrix, and
 a second phase made of a polymeric material composition having a controlled volume resistivity.

2. An electro-optic display according to claim 1 wherein the first phase matrix is carbon nanotubes, silver nanowires, a metal coated open foam structure, or a printed mesh of wires, or a combination thereof.

3. An electro-optic display according to claim 1 wherein the first phase matrix is arranged regularly.

4. An electro-optic display according to claim 1 wherein the first phase matrix is arranged irregularly.

5. An electro-optic display according to claim 1 wherein the first phase makes up less than 10% of a viewing area.

6. An electro-optic display according to claim 1 wherein the controlled volume resistivity of the second phase is not more than $1\times10^{12}$ Ohm-cm.

7. An electro-optic display according to claim 1 wherein the polymeric material composition of the second phase is made from a conductive polymer.

8. An electro-optic display according to claim 7 wherein the conductive polymer is PEDOT-PSS, polyacetylene, polyphenylene sulfide, or polyphenylene vinylene, or combinations thereof.

9. An electro-optic display according to claim 7 wherein the conductive polymer is an ionic conductive polymer.

10. An electro-optic display according to claim 9 wherein the ionic conductive polymer is a polymeric salt.

11. An electro-optic display according to claim 1 wherein the polymeric material composition of the second phase is made from a polymer and an additive.

12. An electro-optic display according to claim 11 wherein the additive is one or more ionic additives.

13. An electro-optic display according to claim 12 wherein the ionic additive is a salt, a polyelectrolyte, a polymer electrolyte, or a solid electrolyte, or a combination thereof.

14. An electro-optic display according to claim 13 wherein the ionic additive is a salt, and the salt is a fluorine-containing salt.

15. An electro-optic display according to claim 11 wherein the additive is a low number average molecular weight polymer containing hydroxyl.

16. An electro-optic display according to claim 15 wherein the additive is polyethylene glycol.

* * * * *